United States Patent
Yu

(10) Patent No.: US 8,207,844 B2
(45) Date of Patent: Jun. 26, 2012

(54) METHODS AND SYSTEMS FOR IDENTIFYING POINTS OF INTEREST

(76) Inventor: Zhihong Yu, Cupertino, CA (US)

( * ) Notice: Subject to any disclaimer, the term of this patent is extended or adjusted under 35 U.S.C. 154(b) by 292 days.

(21) Appl. No.: 12/589,072

(22) Filed: Oct. 16, 2009

(65) Prior Publication Data

US 2011/0090080 A1   Apr. 21, 2011

(51) Int. Cl.
    *G08B 1/08* (2006.01)
(52) U.S. Cl. .......... 340/539.13; 340/506; 340/539.1; 340/3.1; 701/300; 705/7.34; 455/456.1
(58) Field of Classification Search .......... 340/506, 340/539.1, 539.11, 539.13, 3.1; 701/300; 705/7.34; 455/456.1
See application file for complete search history.

(56) References Cited

U.S. PATENT DOCUMENTS 6,031,455 A * 2/2000 Grube et al. ........... 340/539.26
6,608,559 B1 * 8/2003 Lemelson et al. ....... 340/539.13
2008/0274752 A1 * 11/2008 Houri ..................... 455/456.1
2009/0003659 A1 * 1/2009 Forstall et al. ............ 382/113
2009/0005987 A1 * 1/2009 Vengroff et al. .......... 701/300
2009/0150178 A1 * 6/2009 Sutton et al. ................. 705/2

* cited by examiner

Primary Examiner — Daryl Pope
(74) Attorney, Agent, or Firm — Antonio Papageorgiou; Ostrow Kaufman LLP

(57) ABSTRACT

Systems and corresponding methods are provided that include at least one computing device in communication with a plurality of mobile devices over a communication network. The at least one computing device is operable to track with a location service each of a plurality of mobile devices from a departure area to a destination area, collect with each of the plurality of mobile devices objective data with regard to destination area, and compute or otherwise determine an implied interest for the destination area based on the objective data collected. The objective data may include the amount of time each of the plurality of the mobile devices spends at the destination area, the distance(s) traveled by each of the plurality of mobile devices to get to the destination area, and/or the amount of money spent by each owner of the plurality of mobile devices at the destination area.

20 Claims, 4 Drawing Sheets

METHODS AND SYSTEMS FOR IDENTIFYING POINTS OF INTEREST

BACKGROUND OF THE INVENTION

The present application relates to methods and systems for identifying geographic areas of potential interest from a plurality of geographic areas.

Systems exist for identifying geographic areas that are potentially of interest to people, e.g., who are in the general geographic area or who are planning to visit the general geographic area. Some of these systems use web crawlers to identify points of potential interest, such as restaurants, hotels, etc., from written reviews and/or numerical ratings submitted to websites, such as Yelp, Yellowbot.com, by persons that have visited a particular geographic area. This method of identifying points of interest, however, has significant drawbacks. For instance, written reviews without corresponding numerical ratings are difficult for the system to quantify resulting in unreliable identifications. Even when a numerical rating is available, these systems derive the rating from an image tag in the webpage containing therein the numerical rating, such as the image tag [img class="stars_3_half rating average" width="83"], without regard to the time that has passed since the reviewer submitted the numerical rating thereby ignoring any variances in the quality of service at the point of interest over time resulting again in unreliable identifications. Some other systems utilize Google Search APIs and Yahoo! Local Search APIs. But similar issues are encountered. Further, reviews are often old even for relatively popular geographic areas.

Accordingly, there is a need for methods and systems for identifying points of interest that are more reliable and/or that do not exhibit one or more of the disadvantages noted above.

SUMMARY OF THE INVENTION

In one aspect, a system is provided that includes at least one computing device in communication with a plurality of mobile devices over a communication network. The at least one computing device is operable at least to: track with a location service at least a first of the plurality of mobile devices from a first geographic area to a second geographic area; collect with the first of the plurality of mobile devices objective data with regard to at least the second geographic area; and determine based on the objective data an implied interest for at least the second geographic area.

In one embodiment, the at least one computing device is further operable to determine an amount of time the first of the plurality of mobile devices spends at the second geographic area and compute the implied interest for the second geographic area based on the amount of time spent at the second geographic area.

In one embodiment, the at least one computing device is further operable to determine a distance traveled by the first of the plurality of mobile devices to get to the second geographic area and compute the implied interest for the second geographic area based on the distanced traveled to get to the second geographic area.

In one embodiment, the at least one computing device is further operable to determine the amount of money spent at the second geographic area and compute the implied interest for the second geographic area based on the amount of money spent at the second geographic area.

In one embodiment, the at least one computing device is further operable to: determine the amount of time the first of the plurality of mobile devices spends at the second geographic area; determine a distance traveled by the first of the plurality of mobile devices to get to the second geographic area; determine the amount of money spent at the second geographic area; and compute the implied interest for the second geographic area based on the amount of time spent at the second geographic area, the distance traveled to get to the second geographic area, and the amount of money spent at the second geographic area.

In one embodiment, the implied interest is computed based on the following formula: implied interest=(duration+3*equiv)/4+wt*transport, where duration is a function of the amount of time at the second geographic area, equiv is a function of the amount of money spent at the second geographic areas, transport is a function of the distance traveled to get to the second geographic area, and wt is a weight.

In one embodiment, the location service comprises at least one of a GPS, a plurality of cell sites, an 802.11 chip which can connect to a plurality of WiFi hotspots, and a plurality of other mobile devices.

In one embodiment, the at least one computing device is further operable to track the first of the plurality of mobile devices from the second geographic area to a third geographic area and determine that an implied interest should not be computed for the third geographic area.

In one embodiment, the implied interest for the third geographic area is not computed based on determination that the third geographic area is either a home of the owner of the first of the plurality of mobile devices or a place of employment for the owner of the first of the plurality of mobile devices.

In one embodiment, the home or place of employment determination is inferred based on the amount of time the first mobile device is located at the third geographic area.

In one embodiment, the objective data comprises location data for the second geographic area, the at least one computing device is further operable to associate the location data of the second geographic area with at least an address.

In one embodiment, the objective data comprises altitude data for the second geographic area, the at least one computing device is further operable to associate the altitude data of the second geographic area with a particular business at the address.

In one embodiment, the objective data comprises a device identifier for a device, such as Wi Fi router, installed at the second geographic area, the at least one computing device is further operable to associate the device identifier data of the second geographic area with a particular business or service at the address.

In one embodiment, the at least one computing device is further operable to determine an ambiguity with regard to the address and use a second location service to clear the ambiguity.

In one embodiment, the at least one computing device is further operable to: track with a location service a second of the plurality of mobile devices from a third geographic area to the second geographic area; collect with the second of the plurality of mobile devices objective data with regard to at least the second geographic area; determine based on the objective data an implied interest for at least the second geographic area; and determine an aggregate implied interest based on the implied interest from the first of the plurality of the mobile devices and the second of the plurality of mobile devices.

In one embodiment, the at least one computing device is further operable to receive a query for some type of point of interest, identify the second geographic area as a point of interest, and communicate the point of interest in response to the query.

In one aspect, a system is provided that includes at least one computing device in communication with a plurality of mobile devices over a communication network. The at least one computing device is operable at least to: track with a location service at least a first of the plurality of mobile devices from a first geographic area to a second geographic area; track with a location service at least a second of the plurality of mobile devices from a third geographic area to the second geographic area; collect with the first and the second of the plurality of mobile devices objective data with regard to at least the second geographic area, the objective data comprising: an amount of time each of the first and the second of the plurality of mobile devices spends at the second geographic area; distance(s) traveled by each of the first and the second of the plurality of mobile devices to get to the second geographic area; and optionally, an amount of money spent by each owner of the first and the second of the plurality of mobile devices at the second geographic area; and determine based on the objective data available an implied interest for at least the second geographic area.

In one embodiment, the at least one computing device is further operable to track a third of the plurality of mobile devices from a fourth geographic area to a fifth geographic area to a sixth geographic area and detect a fraudulent pattern for the third of the plurality of mobile devices.

In one embodiment, the methods to detect a fraudulent pattern include determining that a visit to at least one of the fourth, fifth, and sixth geographic areas was less than a predetermined threshold.

In one embodiment, the embodiment, the at least one computing device is further operable to: determine an aggregate implied interest for the second geographic area based on the implied interest determined from the first and the second of the plurality of the mobile devices; and communicate the aggregate implied interest for the second geographic area to a subscription service.

Generally speaking the present invention, according to at least one embodiment, uses a novel approach to correlate duration of time spent at geographic area, distance of travel involved to reach the geographic area, and amount of purchase made at the geographic area. A measure combining these three factors is derived that represents the popularity of the geographic area.

Additional aspects of the present invention will be apparent in view of the description which follows.

DETAILED DESCRIPTION OF THE INVENTION

Figure 1:
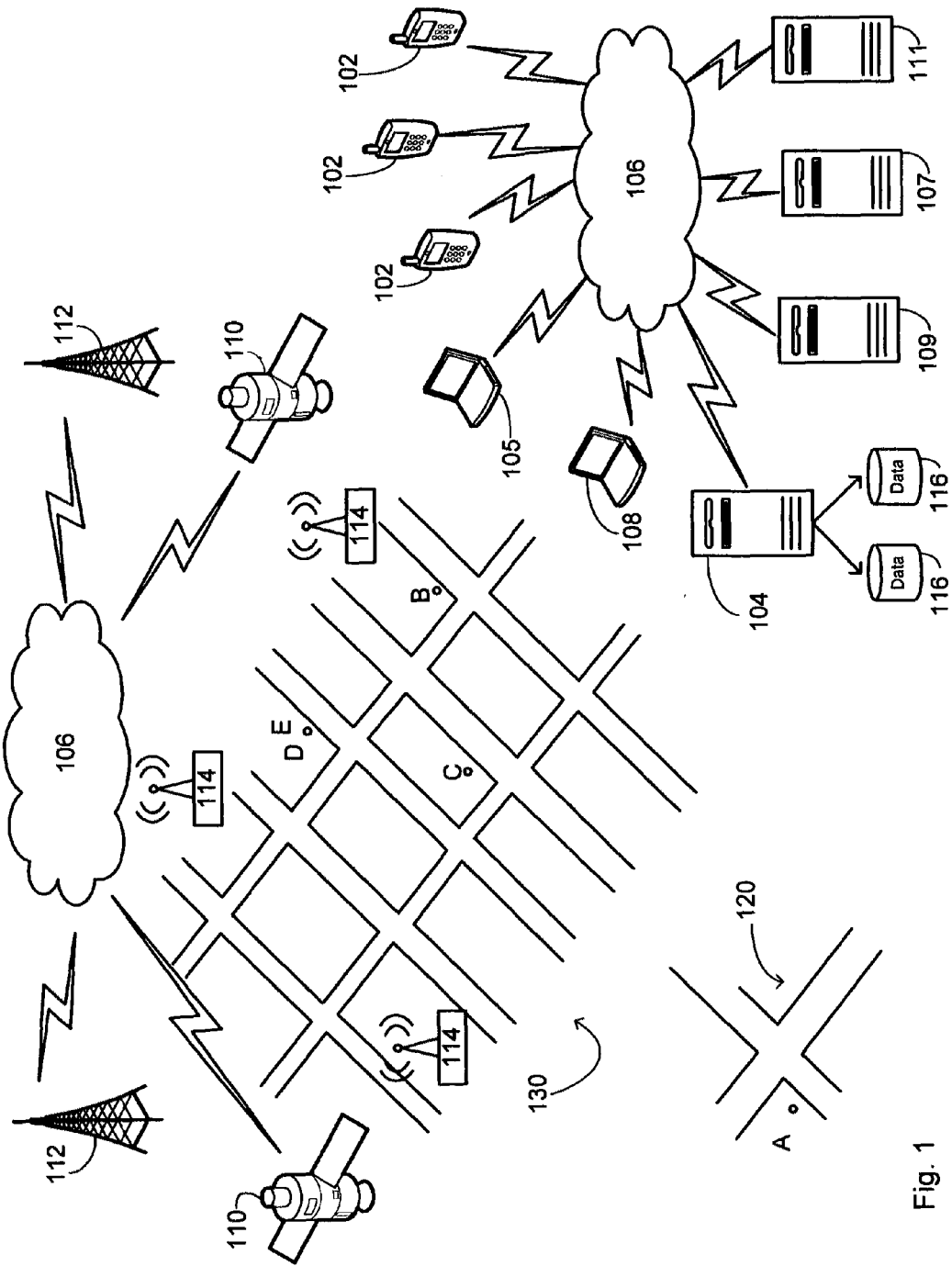
FIG. 1 depicts a system according to at least one embodiment of the systems disclosed herein.

The present application generally provides methods and corresponding systems for identifying a geographic area that may be of interest to one or more persons, hereinafter a point of interest, based on certain criteria discussed herein. A geographic area is generally any identifiable space with or without a finite boundary. For example, a geographic area may be a city, a town, a neighborhood, a structure, such as a building, units within the structure, such as a store or an office, areas within the unit, such as a department within the store or office, etc. For example, neighborhoods, such as Little Italy or China Town, may be identified as points of interest in New York City based on the criteria discussed herein. On a smaller scale, individual businesses, such as particular hotels, restaurants, etc., may similarly be deemed points of interest. Once identified, the point of interest may then be communicated to persons that may have an interest in visiting that area or to a service that later communicates the point of interest to such persons.

The criteria for identifying a point of interest in accordance with the present invention may vary. Generally, the criteria may be any variable, the data for which may be collected as discussed herein, that may be used to imply interest for a particular geographic area. A criterion or variable that implies interest is one that does not rely on the subjective opinion of a visitor of a particular geographic area, such as a user review or rating. Rather, the criterion or variable that implies interest for a particular geographic area relies on data associated with or derived from the objective actions or behavior with regard to that particular geographic area of one or more visitors. For example, interest for a particular geographic area may be implied from objective behavioral data, such as the amount of time a visitor spends at the particular location, the time and/or date of arrival, the time and/or date of departure, the amount of time taken to reach the particular geographic area, the distance traveled to reach the particular geographic area, the number of repeat visits, the amount of transactions and/or money a visitor or a plurality of visitors spend at the geographic area, etc., or a combination or derivation thereof. The data may be considered as a whole independent of time or preferably within specific periods of time, e.g., within the last year, quarter, month, week, day, hour, etc.

It is understood that this objective data may be collected in a variety of ways. Mobile devices with location services, such as GPS, are becoming more and more common. The location of non-GPS enabled mobile devices may also be readily determined from the proximity of the mobile devices to a plurality of transmitter/receiver sites with which the mobile device is capable of communicating, such as cell phone towers, WiFi hotspots, other mobile devices, etc., or a combination thereof, and with common triangulation techniques or collaborative localization. Accordingly, the objective behavioral data used to identify points of interests, in accordance with at least one embodiment of the present disclosure, is collected by tracking visitor actions using their mobile devices, and one or more of these or any other location service.

Various other types of data may also be maintained in furtherance of one or more of the embodiments disclosed herein. For example, a one-way hash of unique mobile device identification number, such as a cell phone number, serial number, mac address, etc., may be maintained to distinguish the movements of the numerous mobile devices likely to travel through any particular area. The collection, use, and dissemination of unique ID hash are preferably covered by individual consent in accordance with advertising industry standard practices. The one-way hash can be MD5 or SHA-1. Personal information regarding the owner of the mobile device, such as name, home address, age, race, weight, religion, occupation, work address, work hours, marital status, stated or implied interests, etc., may also be obtained from the wireless service provider or from any other source. Some or all of this data may be stored in one or more tables, such as Table A.

TABLE A

| Mobile ID | Device Type | Name | Home Address | Sex |
|---|---|---|---|---|
| 8ca81856f82ba06f56ed4 | Cell Phone | John Doe | 950 Third Ave, New York, NY 10022 | M |
| 2aa9615bbb3a542331e7a | iPod Touch | Jane Doe | 111 Federal Building, Rochester, New York 14614 | F |
| a58317139f39fd3c43a1b | Laptop | James Doe | 750 Madison Ave, New York, NY 10022 | M |

Personal information may be collected directly from the mobile device owner, such as with a sign up process, e.g., when the user purchases the mobile device or when the user simply signs up for a service that identifies points of interests for subscribers. Alternatively or in addition, personal information may be inferred from the behavioral patterns observed with the mobile device. For example, it may be inferred that a person is at work when a particular mobile device is observed at a particular place of business for a certain number of hours per day and/or at certain times of the day and/or certain days of the week. For instance, it can be assumed that an individual is at work when he spends over six hours on multiple weekdays at a particular location. Similarly, it may be inferred that a person is at home when a particular mobile device is observed at a particular residential address for an extended period of time and/or at certain hours of the day. Other inferences may also be made with regard to the relevance of particular locations to particular demographics of visitors based on the personal data. For example, relevance may be determined for particular genders, age groups, occupation or occupation classes, e.g., white vs. blue collar, marital status, etc. For example, it may be determined and/or confirmed that geographic areas, such as amusement parks, are more relevant to younger visitors, e.g., between the ages of 15 and 25, than to older visitors, e.g., between the ages of 50 and 70.

Data collected using the location service may include location data, such as the latitude and longitude of the mobile device, the altitude of the device relative to a datum, e.g., mean sea level, the time that the location data is captured, etc. This data will generally be used to derive relevant data for computing implied interest, as discussed herein, such as distances traveled to reach a particular location, duration of time at the location or to reach the location, etc. This data may be used in conjunction with established location data, such as previously collected latitude and longitude, maps, addresses, telephone numbers, business names, subjective reviews and ratings, etc, to associate newly computed implied interest with an established location. For example, visits to a particular latitude and longitude may be associated with a particular address and/or business name. Established location data may be stored in one or more tables, such as Table B.

TABLE B

| Location ID | Latitude | Longitude | Altitude | Hotspot device ID | Business Name | Address | Phone no. |
|---|---|---|---|---|---|---|---|
| A | LA1 | LO1 | 100 | 00:23:cd:82:ad:ae | Joe's Diner | 300 Lexington Ave, New York, NY First Floor | 123-456-7891 |
| ... | | | | | | | |
| D | LA2 | LO2 | 100 | 02:34:56:78:90:ab | Ed's Electronics | 750 Madison Ave, New York, NY First Floor | 123-456-7892 |
| E | LA2 | LO2 | 115 | 00:0f:b5:ee:b5:14 | AP Consulting | 750 Madison Ave, New York, NY Second Floor | 123-456-7893 |

Some geocoders, such as GClientGeocoder, can perform reverse geocoding which returns the closest address based on location data. In certain instances, the location information returned from a location service may be ambiguous. For example, a send location request made from a Blackberry Storm within 507 Ellis Street may return GPS coordinates that ambiguously show a point between 507 and 535 Ellis Street. Various techniques may be used to clarify the ambiguity. For example, the send location request may be repeated until a significant number of essentially identical readings are returned, e.g., +/−1% to 5%. Alternatively or additionally, statistical methods may be used to derive the correct location. Additionally, locations returned from low confidence sources may be compared and/or be given less weight than locations from high confidence sources. In the example above, a location returned using GPS that indicates that the customer approaches the entrance of 507 Ellis Street may be deemed the most likely location as compared to an ambiguous location later returned using cellsite/assisted mode.

The data collected, and the derived data may also be used to confirm certain assumptions, such as whether the visitor is at home or at work. The subjective reviews and ratings may similarly be used to confirm the objective identification of an area as a point of interest. All of the data discussed herein may be stored in one or more tables and in one or more databases.

Referring to FIG. 1, a system according to at least one embodiment includes at least one computer, such as the server computer 104, coupled to at least one mobile device 102 over a communication network 106. It is understood that multiple server computers may be used to provide the functionality disclosed herein either alone or in combination, such as a user profile server 107, a local search server 109, an aggregation server 111, etc. The communication network 106 may be a local area network (LAN), a wide area network (WAN), the Internet, a telephone network (POTS), a wireless network, such as a cellular network, a WiFi network, or a combination of wired and/or wireless networks. Various types of mobile devices may be used in accordance with at least one of the embodiments disclosed herein. A mobile device 102 is generally any wirelessly enabled device, such as a cellular phone 103, a laptop computer 105, an iPod, a smart phone, such as a blackberry or iPhone, a personal data assistant or PDA, etc. The at least one server computer 104 preferably includes or is associated with at least one database 116 that contains some or all of the data discussed herein. Although the methods and system may be disclosed herein in relation to certain software or hardware, it is understood that the functionality discussed herein may be implemented in either software, hardware, or a combination thereof.

Client computers 108 may also be coupled to the server 104 over the network 106. In this instance, the server computer 104 may collect objective data from the mobile device 102, determine therefrom whether or not a geographic area is a point of interest, and communicate the point of interest to at least one user, e.g., on the client computer 108 or another mobile device 102. As noted above, the mobile devices 102 may be either cellular and/or WiFi enabled. In this respect, the mobile device 102 is further coupled to the server 104 via a cell site 112 and/or a WiFi hotspot 114. GPS enabled mobile devices 102 are generally coupled to at least one GPS satellite 110.

In operation, a mobile device 102 may originate from location A within a town 120 and continue to destination C within a city 130. The mobile device 102 may later leave destination C and travel to destination B, followed by destination D and E before returning to the original point of departure A. Note, locations D and E are located in the same building, but on different floors of the building. The location, altitude, departure time, arrival time, and distance to each of the destinations may be determined and/or tracked via one or a combination of the GPS satellites 110, cell site 112, and WiFi hotspots 114. This data may then be used to compute an implied interest, as discussed herein, for each location. The implied interest may be computed for some or every mobile device 102 that visits points A, B, C, D and E, and an aggregate implied interest, as discussed herein, may be computed for each of these locations. Each implied interest calculation may be stored in one or more tables, such as Tables C and D. Aggregate implied interest may be computed for each or a plurality of different demographic groups. For example, an aggregate implied interest for a particular location may be computed for two or more types of visitors, e.g., male vs. female, different age brackets, etc. In this instance, an aggregate implied interest table, such as that shown in Table D, may be maintained so that queries for each demographic category can be quickly serviced. It is understood that aggregation may be performed on demand and/or in real time from the implied interest data, using SQL queries. Accordingly, aggregate implied interest may be computed for any one or a combination of the demographic categories discussed herein.

TABLE C

| Location ID | Date of Visit | Time Spent (Min.) | Distance Traveled | Amount of purchase | Traveler ID | Implied Interest |
|---|---|---|---|---|---|---|
| A | 01/01/09 | 30 | 50 | 0 | 8ca81856f82ba06f56ed4 | 84.42 |
| A | 01/01/09 | 35 | 5 | 34.54 | 2aa9615bbb3a542331e7a | 47.94 |
| A | 01/01/09 | 42 | 12 | 0 | a58317139f39fd3c43a1b | 66.11 |

TABLE D

| Location ID | Aggregate Implied Interest (Total) | Aggregate Implied Interest (Male) | Aggregate Implied Interest (Female) |
|---|---|---|---|
| A | 55 | 23 | 32 |
| B | 83 | 40 | 43 |
| C | 76 | 40 | 36 |
| D | 98 | 55 | 43 |

Certain data, such as GPS location data, may be captured with the mobile device 102 and communicated to the computer system that performs the implied interest computation. Other data, such as location data derived from cell site, one or more WiFi hotspots, or other mobile device signal or signals, may be communicated from the particular device/system determining the location of the mobile device to the system that performs the implied interest computation. Computations may be performed by the mobile device 102, preferably by the server 104, or a combination thereof. The results of the computation would be stored on server 104 and optionally, cached on persistent storage of mobile device.

The aggregate implied interest may then be computed and used to identify particular points of interest from a plurality of points or areas. As is well understood, this may be accomplished in various ways. For instance, assuming the aggregate implied interest was a function of total visits, within a certain period of time or otherwise, an area with a significantly large number of visits may be identified as a point of interest. For example, large venues, such as arenas, may be identified as points of interest based on a peak number of visits over time or based on a running total number of visits. This information may be used in conjunction with previously established venue information to identify the venue as a point of interest only at particular times, such as when the venue has a scheduled show. Points of interest determinations may also be made relative to other similarly situated areas. The size or capacity of the venue in relation to actual visits may also be taken into account. For example, a museum with visits equaling 100 percent of capacity may be of greater interest than a museum with visits equaling 50 percent of capacity even though the total number of visits may be greater in the latter museum.

If the implied interest is a function of the distance traveled to a point, an area that is traveled to over a significant distance may be considered a point of interest. Similarly, if the implied interest is a function of the duration of the visits, a point with significantly long visits may be considered a point of interest. As noted above, the number of transactions and/or the amount of money spent at a point may also be a variable in determining the implied interest. In this instance, the more transactions or money that is spent at a location, either individually or in total, the more it can be considered a point of interest. All of the point of interest determinations may be made on a standalone basis, e.g., running total, total over a period of time, etc., or relative to other similarly situated locations.

Figure 2:
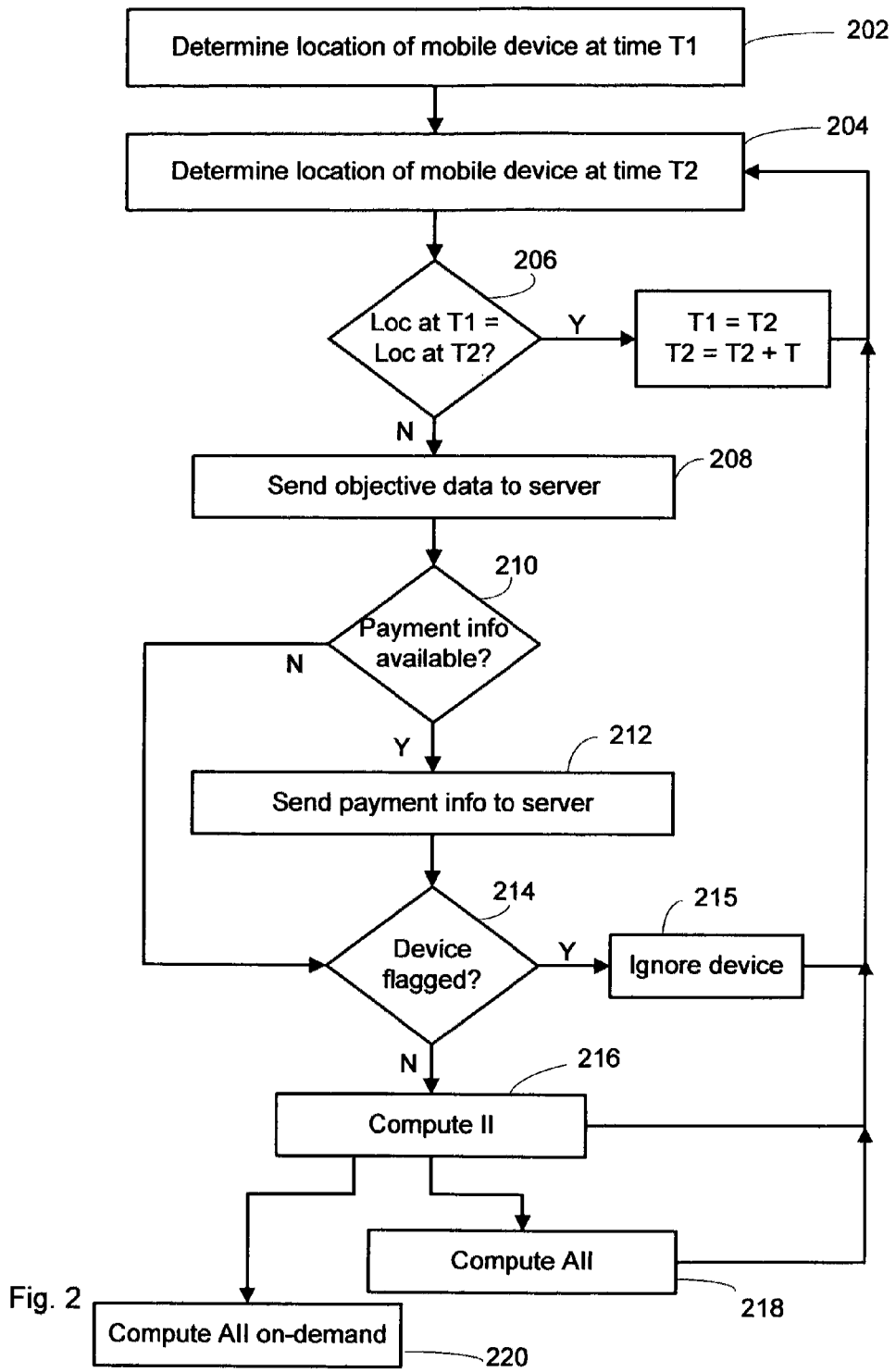
FIG. 2 depicts a flow chart of a process according to at least one embodiment of the methods disclosed herein.

Referring to FIG. 2, a method for identifying a point of interest in accordance with at least one embodiment begins by determining the location of a mobile device and any other objective data at a first time, step 202. The first time may be when the device is first turned on or when the device is first noticed in the network. For example, the device may be turned on at the owner's residence A. The location of the mobile device and any other objective data may be determined again at a second time, step 204. In at least one embodiment, the location is determined or polled with the mobile device periodically, such as every 10, 20, 30, . . . , 60, etc. seconds or any time in between.

A determination may then be made as to whether the location of the device at the second time is the same as the location of the device at the first time, step 206. If the device has not changed location, i.e., the locations at the first and second times are essentially the same, then the location of the device may again be determined at some later time. If, however, the device has changed locations, i.e., the locations of the first and second times are different by a predetermined threshold, the location data and any other objective data may be communicated to the server 104, step 208. Steps 202 to 208 are preferably repeated until sufficient data has been collected to determine the departure time of the mobile device from a starting point, e.g., point A, as well as the arrival and departure times of the mobile device at each additional points, e.g., points B, C, D, and E. The system may therewith determine the duration of time a mobile device stays at a particular geographic area. Alternatively or additionally, the system may repeat steps 202 to 208 until sufficient data has been collected to determine the time spent traveling or the distance traveled to reach a particular geographic area, e.g., points B, C, D, and E. The distance may be actual distance traveled or a straight line distance, for example, if intermediate points are not available. If at 210, additional objective data, such as payment or transaction information is available at a particular location, then the additional objective data may also be communicated to the server 104 at 212. The data noted above are preferably transmitted to the server 104 under permission of the mobile device owner or user. The implied interest may then be computed for each location at 216 by the server 104 followed at some time later by the computation of aggregate implied interest at 218. The steps 202-216 or any portion thereof may be computed for each of a plurality of mobile devices and for each of a plurality of locations. It is understood that the aggregate implied interest may be computed periodically, for example, when it is determined that the mobile device 102 has reached a destination. Alternatively or in addition, the aggregate implied interest may be computed on-demand or in the background by the server 104, step 220.

The process discussed herein may be abused to infer greater interest than objective data would indicate. Therefore, in at least one embodiment, fraud protection measures are implemented that detect fraudulent patterns. For example, a person may carry a mobile device and skip through several locations so that the ranking for those locations in terms of aggregate implied interest is deliberately boosted. In this instance, a minimum amount of time that a device stays at a location may be required before that particular visit contributes to the implied interest. The minimum amount of time may be location specific. That is, the type of location may dictate the amount of time. Similarly, a pattern of short visits to locations that typically demand relatively long stay may trigger a fraud alert. In addition to the location information, one-way hash of the device ID, such as the phone number or mac address, may also be communicated to the server 104. Once fraudulent patterns are detected for a particular device, the server 104 would flag its ID hash at 214 in FIG. 2 and ignore the implied interest for this device at 215. Although the fraud check is discussed at step 214, it is understood that the fraud check can be performed after any step of the process. For example, the fraud check can be carried out at every destination.

The following heuristics can be used to detect fraudulent patterns: within certain time period (a day, a week), there are too many short visits to selected points of interest; fraud flag is also raised when long duration of stay is outside business hours at a location which is not the user's work place. Considering the cost of buying a mobile device which requires monthly service fees, fraud prevention measure would soon reveal to the fraudsters that fraudulent action is not economical. As a special non-fraudulent case, a person's implied interest wouldn't count toward the point of interest where he/she works. It is understood that additional fraud detection rules may be developed and implemented herein. The above heuristics may need constant revisit for improvement. The data related to suspicious pattern and fraud detection decision are recorded in a separate table for human review.

The above logic is preferably executed repeatedly on the mobile device. Anticipating battery outage, etc, location data can be periodically stored in persistent storage of the device. Then, at much longer intervals, location and other objective data can be sent to the server 104 so that mobile device power is preserved and bandwidth is not wasted. The server 104 would store the data in one or more databases and when the mobile device leaves a previous point of interest, data records for that point of interest may be consolidated and the implied interest computed therefrom.

In operation, a mobile device may leave location A. The system may determine whether or not that location is a residence or other location that may be ignored for computing an implied interest. The system thereafter tracks the mobile device 102 to location B. The system may again determine whether or not location B is a location that may be ignored for computing implied interest. If B is not ignored, the implied interest may then be computed for location B. The same may be repeated for locations C, D, and E. As noted herein, the mobile device 102 may compute the implied interest with the objective data collected or the objective data may be communicated to the server 104 for computation. Optionally, mobile device users may be given the option to decline sending their presence information for some or all of the places he/she visits.

The general goal, in at least one embodiment of the methods and systems disclosed herein, in collecting the objective data is to establish a correlation between time, distance, and optionally purchase data. In this instance, a formula may be used to convert the distance traveled to a particular point and the time spent at that point into a common unit of measure. In one embodiment, the distance is converted as follows:

> For distances less than 15 miles: Travel time (minutes)=2.76+(1.77*distance (miles)).

> For distance greater than or equal to 15 and less than or equal to 30 miles: Travel time (minutes)= 3.42+(1.71*distance (miles)).

If the person travels more than 30 miles, then the distance of 30 may be used in the above formula of paragraph 0051.

Intuitively, the farther a visitor is willing to travel to a particular location, the more interest is exhibited. This component may be labeled the transport component. A weight (wt (between 0 and 1)) may be applied to reduce the impact of the transport component on the implied interest as travel may be an auxiliary indicator for interest.

As noted above, the implied interest may also be a function of the amount of purchases made at a particular location. Applications, such as iSwipe, that are able to complete credit card transaction on-the-go, may be used to collect the purchase data. The purchase component of implied interest may be deemed equiv—shorthand for equivalence of purchase. Assuming that such application sends the value of purchase to server 104, the following formula may be used to convert the purchase component into time:

> equiv=purchase/(hourly rate of wage)

The hourly rate of wage is an estimate of the hourly rate of the mobile device owner or user, which may be determined from empirical data based on the ZIP code of the office where owner works, e.g., from www.census.gov/epcd/www/zbp_base.html. If an owner profile associated with the device is accessible, say from wireless service provider, actual wage can be used in the formula above. Intuitively, the equiv component is a better indication of interest than duration component. But, the availability of the equiv component is much less likely than the duration component, which is the reason that time is used as the common denominator or unit of measure. However, it is understood that any unit of measure may be used to compute implied interest.

In one embodiment, implied interest (II) is computed as follows:

> II=(duration+3*equiv)/4+wt*transport, if equiv is available.

In this respect, more weight is given to the equiv component if it is available.

> II=duration+wt*transport, if equiv is not available.

Although the implied interest is computed above in a time unit, it may be computed in any unit of measure and/or an arbitrary unit, such as numerical, e.g., 1, 2, 3, etc., alphabetic, e.g., A, B, C, or any fraction thereof. As long as the same unit of measure is used throughout the system, the implied interest value should represent the interests exhibited by the plurality of mobile device users.

The aggregate implied interest is generally a function of a plurality of implied interest computations. Aggregate implied interest value may be integrated into local search engines to provide intuitive guidance in identifying relevant points of interest. The aggregate implied interest has the following benefits compared to the conventional approach of crawling review websites: there is no reliance on written customer reviews, removing complexity of analyzing such reviews; aggregate implied interest is numerical, therefore it is natural fit as sorting criteria for local search engines; and its calculation may factor in the damping effect of historical implied interest computations. Of course, star ranking from social review sites can be consulted along with the aggregate implied interest.

Figure 3:
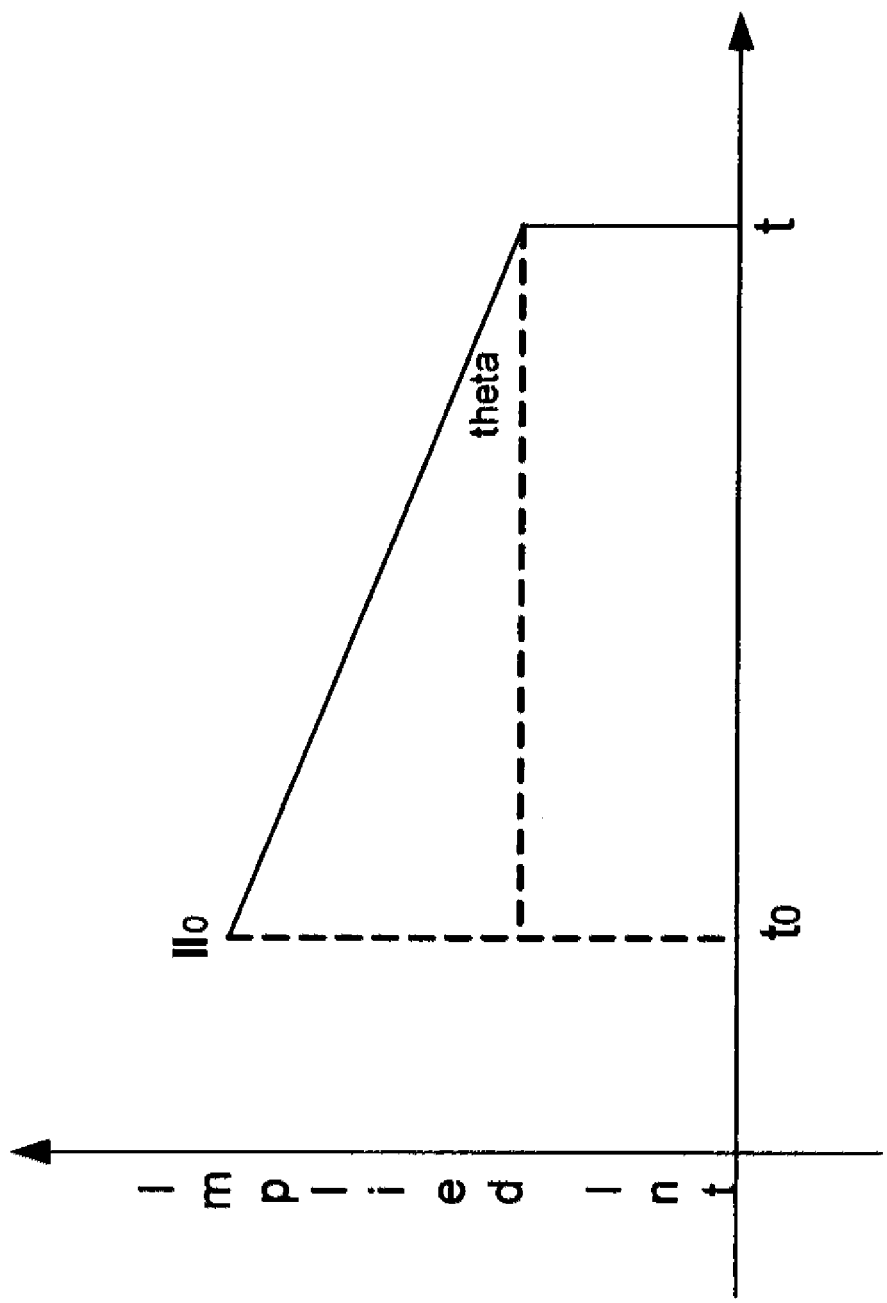
FIG. 3 depicts a graph of implied interest over time according to at least one embodiment of the methods disclosed herein.

Aggregate implied interest may be computed in various ways. In at least one embodiment, aggregate implied interest is a function of the sum of prior implied interest values for a given point of interest. Since it's cumbersome to interpolate an ideal curve that reflects damping effect of historical implied interest values for aggregate implied interest because new implied interest values are likely to be continuously sent to the server, we can use a linearly damping model. Referring to the graph shown in FIG. 3, suppose one implied interest value was sampled at time $t_0$. The contribution of $II_0$ to the aggregate implied interest (AII) at time t may be ($II_0$–tan(theta)*(t–$t_0$)). Therefore, aggregate implied interest can be computed as follows:

> AII=Σ($II_k$–tan(theta)*(t–$t_k$))

Here we assume each implied interest has the same rate of damping over time, resulting in tan(theta) being constant. So we can rewrite the above formula as follows:

> AII=Σ($II_k$Σw*(t–$t_k$))

Where w is a constant whose value is close to 0, such as 0.008.

As noted above, personal information may be maintained for owners/users of mobile devices. In at least one embodiment, a personal profile is maintained for a user of a service that identifies points of interest for the user. That is, if a subscriber opts-in, the server 104 can establish a personal profile for the subscriber. The personal information may also be stored on the mobile device and a subset of the personal information, such as the demographic information, may be communicated to the server 104 for the purpose of identifying a point of interest for that particular user. The profile may include the following personal information: phone number; most frequently visited points of interest; points of interest where most purchases were made, etc. This profile would help present better local search results to the subscriber. For example, if a subscriber visits Whole Food Market near his/her home almost every week, Whole Food Market may be stored as a preferred point of interest for the subscriber and when he/she is on vacation and performs local search for 'grocery', organic grocery stores should be listed prominently among the results. Similarly, points of interest which serve organic food should be displayed when he/she views/searches for food-related items. This significantly increases the relevance of results for keyword search with local intent.

Once a sufficient set of data is obtained to determine whether or not a location is a point of interest, the system may receive one or more queries for such information. For example, the mobile device 102 or a client device 108 may submit a query for points of interest. The query may be a direct request from a user, e.g., through a web browser or other application, or automatically without direct intervention from the user, e.g., when the user enters a certain area. In response to the query, the system preferably communicates relevant points of interest as determined herein to the user. The points of interest may be communicated in a variety of ways. For example, a list of points of interest may be communicated to the mobile device 102 or the client device 108. Alternatively or additionally, the points of interest may be identified in a map or any other suitable user interface.

Figure 4:
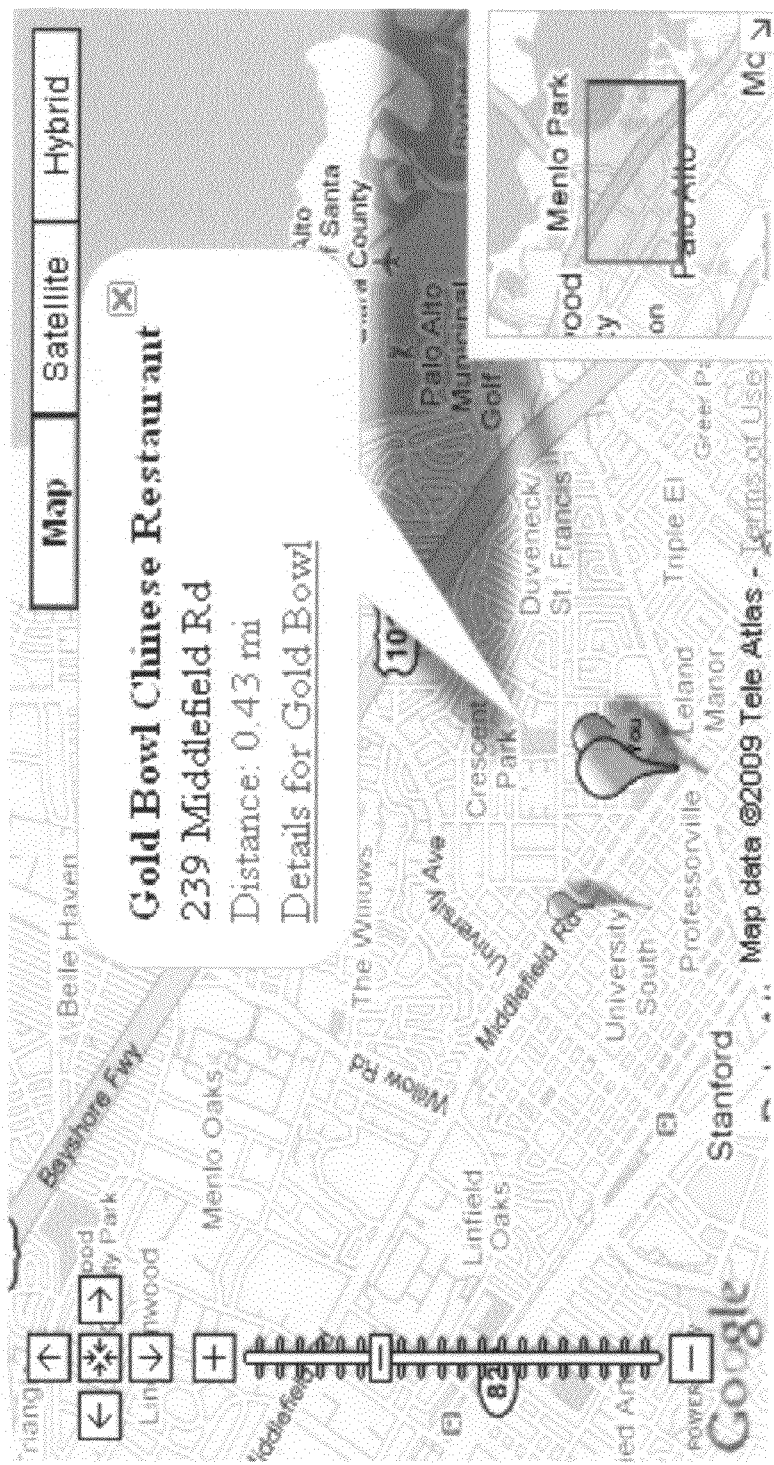
FIG. 4 depicts a sample local search result based on at least one embodiment of the methods disclosed herein.

Referring to FIG. 4, a sample result screen from a local search engine with knowledge of the current location of mobile device user is shown (denoted by the round marker labeled You). Each point of interest may have a marker whose size is (logarithmically) proportional to its aggregate implied interest. When the viewer clicks any marker, an information window pops up with the name of the point, its distance to where mobile device user currently is, and a hyperlink which would bring up more details for the point of interest. A logarithm scale may be used if the spectrum of aggregate implied interest readings for points of interest in search results is too wide such that linear scale would end up with unnecessarily large marker(s). For a geographic region where multiple markers for points of interest are layered over each other, arrangement can be made such that larger markers are displayed on top of smaller markers.

Businesses, such as Starbucks, often make decisions on opening new store or closing not so profitable store(s). A service, through subscription in some embodiments, can be provided to a business which periodically sends data feeds concerning the aggregate implied interest readings of its stores to facilitate decision making on local or regional scale. For the business, implications made from the data feeds about a particular store can be combined with financial reports of the store so that new approaches for generating more revenue can be found or for determining the success of certain approaches. For example, if a store with high aggregate implied interest readings over recent months generates relatively low revenue, promotions may be made in that store to increase sales. The data feed may optionally contain demographic information such as the mix of male versus female customers based on which effective campaign can be organized that targets the dominant demographic group visiting that store. As another example, if a store consistently has low aggregate implied interest readings and low revenue over certain time period, it may be put on the list of stores to be closed in the future. The benefit of such service is that degree of customer satisfaction can be inferred without the need to ask customers visiting the stores to fill out surveys.

As noted above, one or more databases may be used in accordance with the methods and systems disclosed herein. The following sample SQL code may be used:

```
create table POI_II(
    device_id_hash varbinary NOT NULL,
    longitude float NOT NULL,
    latitude float NOT NULL,
    altitude float NOT NULL,
    POI_ID varchar(24),
    Hotspot_device_ID bigint,
    rec_time datetime, /* time when this location is reported */
    distance float, /* distance from previous POI */
    purchase money, /* amount of money spent at the POI */
    impl_int float /* implied interest, can be NULL */
    CONSTRAINT [PK_POI_II] PRIMARY KEY CLUSTERED
    (
        [device_id_hash] ASC
    ))
``` device_id_hash column is the one-way hash of device ID. POI_ID is the unique identifier for the point of interest. Hotspot_device_ID is identifier for hotspot router.

This table generally records the data each mobile device 102 sends to server 104. Multiple records may exist for a single point of interest whose impl_int field is empty. The server 104 can consolidate these records and compute implied interest when a newer record indicates that the device has left the previous point of interest. In order to improve performance, sharding can be used to partition records according to device_id_hash field. This would increase performance through parallelism.

In previous example Whole Food Market was used to denote a chain of stores where inference can be made with stores of similar nature. To facilitate such reasoning, there may be one more table that records category information for each point of interest. A sample DDL for this table is shown below:

```
CREATE TABLE [dbo].[POI_Category](
    POI_ID varchar(24),
    CAT_ID varchar(24)
)
```

CAT_ID is identifier for category.

While the foregoing invention has been described in some detail for purposes of clarity and understanding, it will be appreciated by one skilled in the art, from a reading of the disclosure that various changes in form and detail can be made without departing from the true scope of the invention in the appended claims.

What is claimed is:

1. A system comprising at least one computing device in communication with a plurality of mobile devices over a communication network, the at least one computing device operable at least to:
   track with a location service at least a first of the plurality of mobile devices from a first geographic area to a second geographic area;
   collect with the first of the plurality of mobile devices objective data with regard to at least the second geographic area, wherein the objective data comprises a distance traveled by the first of the plurality of mobile devices to get to the second geographic area; and
   compute an implied interest for at least the second geographic area based on the distance traveled to get to the second geographic area.

2. The system of claim 1, the at least one computing device further operable to determine an amount of time the first of the plurality of mobile devices spends at the second geographic area and compute the implied interest for the second geographic area based on the amount of time spent at the second geographic area.

3. The system of claim 1, the at least one computing device further operable to determine an amount of money spent at the second geographic area and compute the implied interest for the second geographic area based on the amount of money spent at the second geographic area.

4. The system of claim 1, the at least one computing device further operable to:
   determine an amount of time the first of the plurality of mobile devices spends at the second geographic area;
   determine an amount of money spent at the second geographic area; and
   compute the implied interest for the second geographic area based on the amount of time spent at the second geographic area, and the amount of money spent at the second geographic area.

5. The system of claim 4, wherein the implied interest is computed based on the following formula:

$$\text{implied interest} = ((\text{duration} + (3 * \text{equiv}))/4) + (\text{wt} * \text{transport})$$

where duration is a function of the amount of time spent at the second geographic area, equiv is a function of the amount of money spent at the second geographic area, transport is a function of the distance traveled to get to the second geographic area, and wt is a weight.

6. The system of claim 1, wherein the location service comprises at least one of a GPS, a plurality of cell sites, a plurality of WiFi hotspots, and a plurality of other mobile devices.

7. The system of claim 1, the at least one computing device further operable to track the first of the plurality of mobile devices from the second geographic area to a third geographic area and determine that an implied interest should not be computed for the third geographic area.

8. The system of claim 7, wherein the implied interest for the third geographic area is not computed based on determining that the third geographic area is one of a home of an owner of the first of the plurality of mobile devices or a place of employment for the owner of the first of the plurality of mobile devices.

9. The system of claim 8, wherein the home or place of employment determination is inferred based on an amount of time the first mobile device is located at the third geographic area.

10. The system of claim 1, wherein the objective data comprises location data for the second geographic area, the at least one computing device further operable to associate the location data of the second geographic area with at least an address.

11. The system of claim 10, wherein the objective data comprises altitude data for the second geographic area, the at least one computing device further operable to associate the altitude data of the second geographic area with a particular business at the address.

12. The system of claim 10, the at least one computing device further operable to determine an ambiguity with regard to the address and use a second location service to clear the ambiguity.

13. The system of claim 1, the at least one computing device further operable to:
track with a location service a second of the plurality of mobile devices from a third geographic area to the second geographic area;
collect with the second of the plurality of mobile devices objective data with regard to at least the second geographic area;
determine based on the objective data an implied interest for at least the second geographic area; and
determine an aggregate implied interest based on the implied interest determined from the first of the plurality of the mobile devices and the second of the plurality of mobile devices.

14. The system of claim 13, the at least one computing device further operable to receive a query for a point of interest, identify the second geographic area as a point of interest based on its associated aggregate implied interest, and communicate the point of interest in response to the query.

15. A system comprising at least one computing device in communication with a plurality of mobile devices over a communication network, the at least one computing device operable at least to:
track with a location service at least a first of the plurality of mobile devices from a first geographic area to a second geographic area;
track with a location service at least a second of the plurality of mobile devices from a third geographic area to the second geographic area;
collect with the first and the second of the plurality of mobile devices objective data with regard to at least the second geographic area, the objective data comprising;
the amount of time each of the first and the second of the plurality of mobile devices spends at the second geographic area;
a distance traveled by each of the first and the second of the plurality of mobile devices to get to the second geographic area; and
optionally, an amount of money spent by each owner of the first and the second of the plurality of mobile devices at the second geographic area; and
determine based on the objective data available an implied interest for at least the second geographic area.

16. The system of claim 15, the at least one computing device further operable to track a third of the plurality of mobile devices from a fourth geographic area, to a fifth geographic area, and to a sixth geographic area and detect therewith a fraudulent pattern.

17. The system of claim 16, wherein detecting a fraudulent pattern comprises determining that a visit to at least one of the fourth, fifth, and sixth geographic areas was shorter than a predetermined threshold.

18. The system of claim 17, the at least one computing device further operable to:
determine an aggregate implied interest for the second geographic area based on the implied interest determined from the first and the second of the plurality of the mobile devices; and
communicate the aggregate implied interest for the second geographic area to a subscription service.

19. A system comprising at least one computing device in communication with a plurality of mobile devices over a communication network, the at least one computing device operable at least to:
track with a location service at least a first of the plurality of mobile devices from a first geographic area to a second geographic area;
collect with the first of the plurality of mobile devices objective data with regard to at least the second geographic area, wherein the objective data comprises an amount of money spent at the second geographic area; and
compute an implied interest for at least the second geographic area based on the amount of money spent at the second geographic area.

20. A system comprising at least one computing device in communication with a plurality of mobile devices over a communication network, the at least one computing device operable at least to:
track with a location service at least a first of the plurality of mobile devices between a plurality of geographic areas, including a first geographic area, a second geographic area, and a third geographic area;
collect with the first of the plurality of mobile devices objective data with regard to at least the second geographic area;
compute based on the objective data an implied interest for at least the second geographic area;
determine that the third geographic area is at least one of a home of an owner of the first of the plurality of mobile devices and a place of employment of the owner of the first of the plurality of mobile devices, and
decide based on the determination not to compute an implied interest for the third geographic area.

* * * * *